May 23, 1944.   C. W. SCHREIBER   2,349,638
ARTICLE TRANSFER MECHANISM
Filed March 3, 1943   6 Sheets-Sheet 1

Inventor
C. W. Schreiber,
By Rule my Hoge,
Attorneys

May 23, 1944.　　C. W. SCHREIBER　　2,349,638
ARTICLE TRANSFER MECHANISM
Filed March 3, 1943　　6 Sheets-Sheet 2

May 23, 1944.   C. W. SCHREIBER   2,349,638
ARTICLE TRANSFER MECHANISM
Filed March 3, 1943   6 Sheets-Sheet 3

Inventor
C. W. Schreiber,
By Rule and Hoge
Attorneys

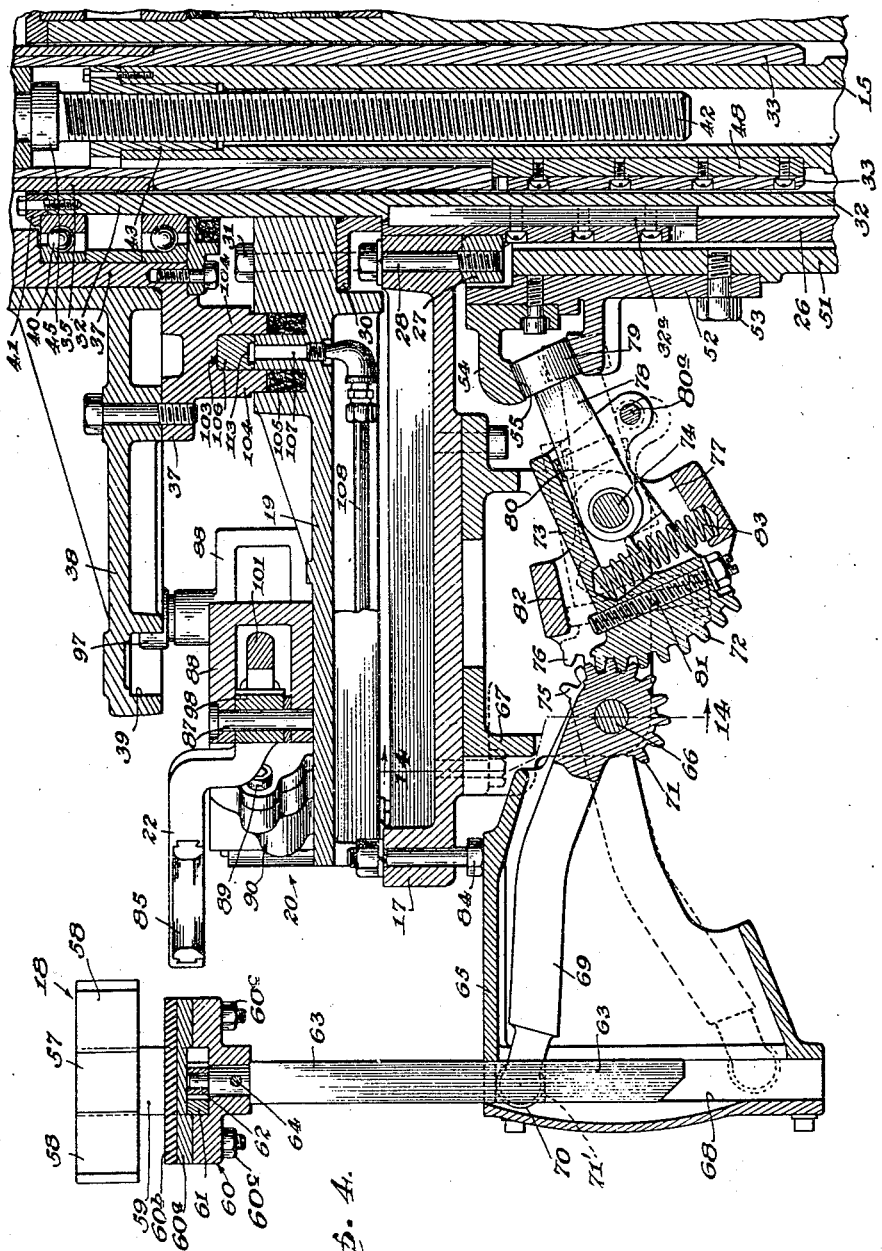

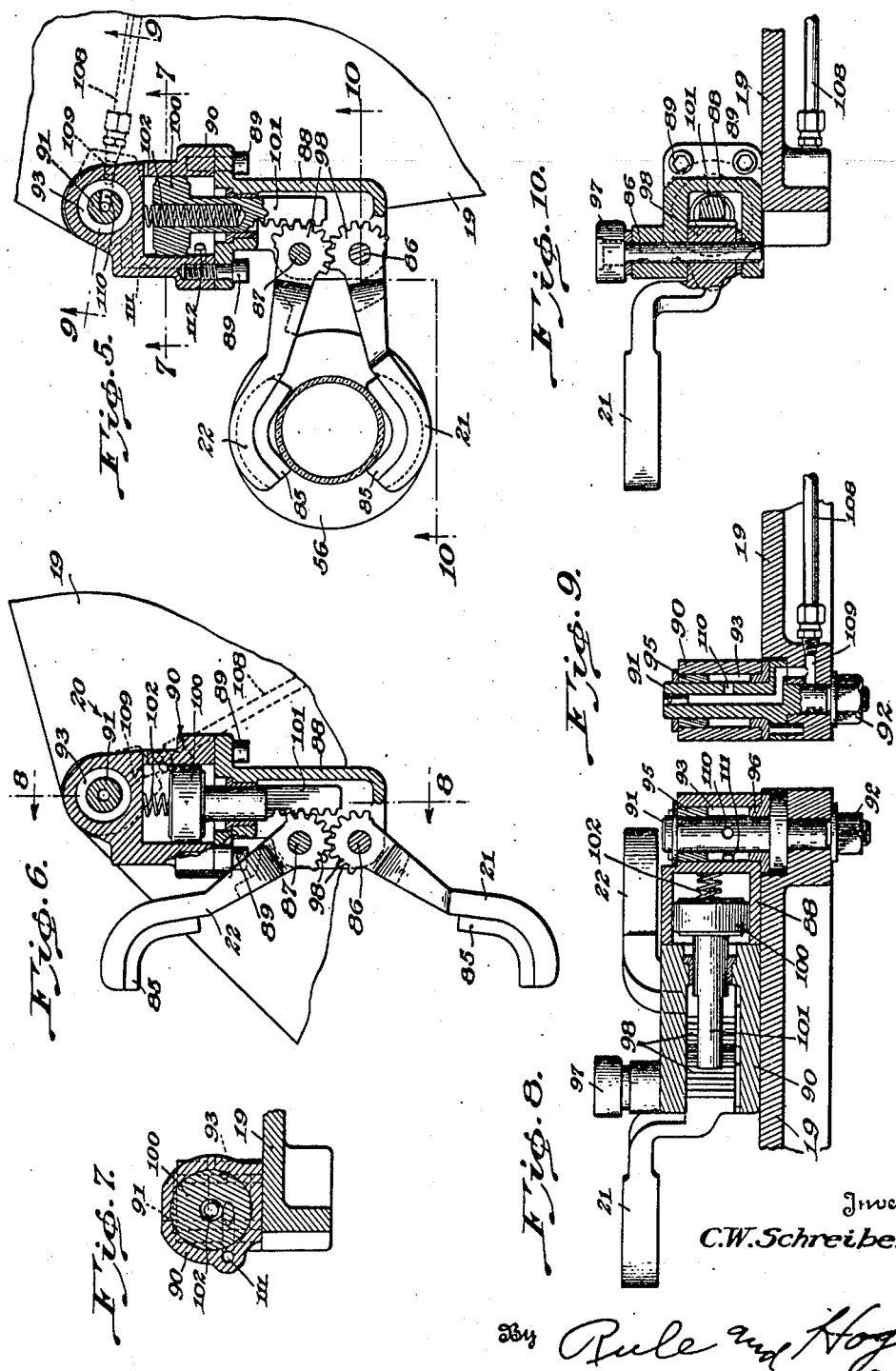

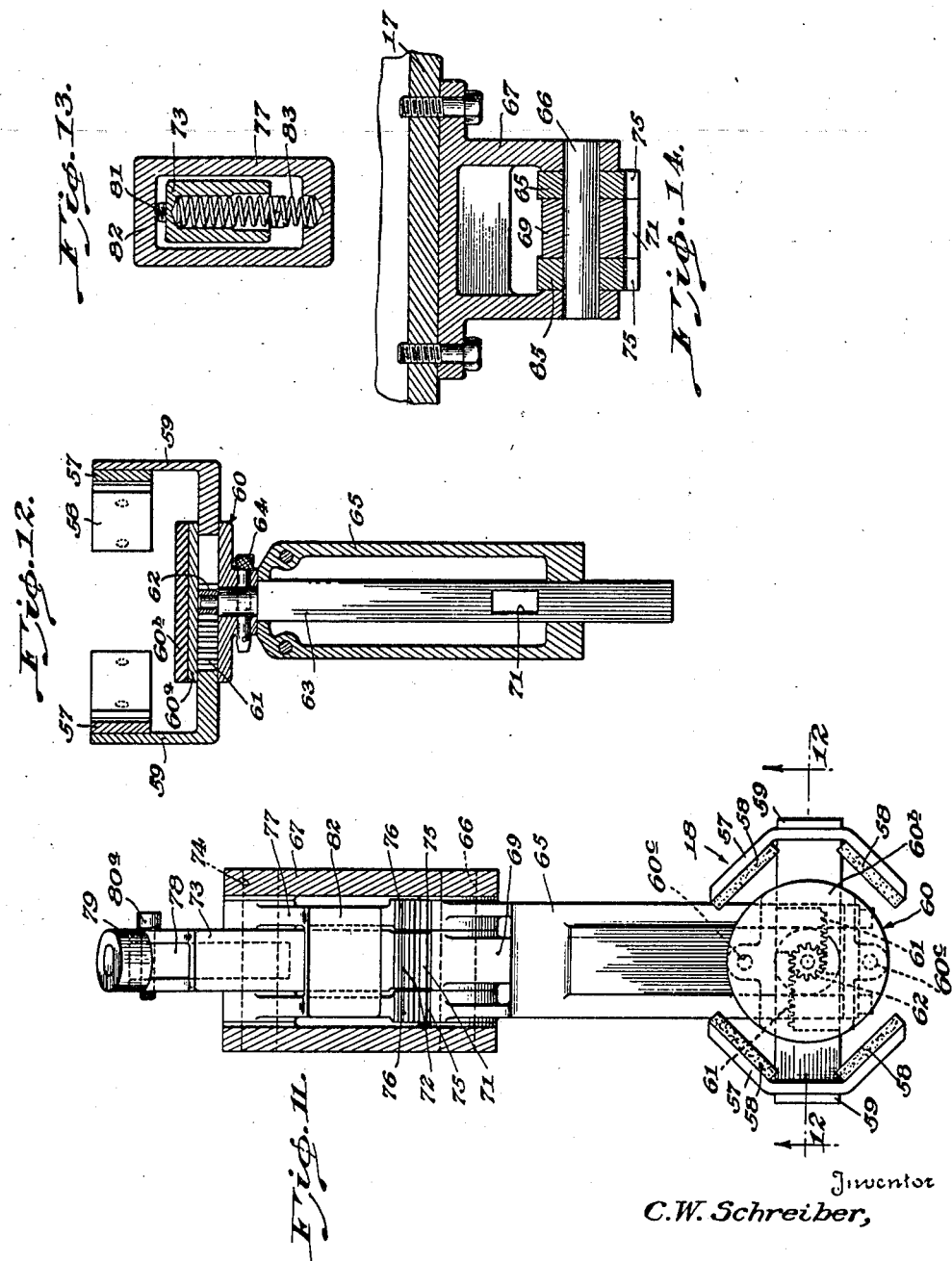

Patented May 23, 1944

2,349,638

UNITED STATES PATENT OFFICE 2,349,638

ARTICLE TRANSFER MECHANISM

Carl W. Schreiber, Toledo, Ohio, assignor, by mesne assignments, to Owens-Illinois Glass Company, Toledo, Ohio, a corporation of Ohio Application March 3, 1943, Serial No. 477,846

11 Claims. (Cl. 198—210)

My invention relates to apparatus adapted for transferring articles from one position to another. The invention in the form herein illustrated is of use in the glass manufacturing art and is particularly adapted for transferring glass articles from one machine or position to another. In the manufacture of glassware, including tumblers and numerous other articles, which are formed by a blowing or molding process, the formed article has attached thereto a moil of waste glass which must be severed therefrom to complete the article. The apparatus herein shown is designed for receiving such articles directly from the forming machine or a take-off device associated therewith, and transferring the articles to a burn-off machine by which the moil is severed. An object of the present invention is to provide a transfer apparatus which may form part of an installation for performing the various operations automatically in place of the hand methods which are commonly employed in manufacturing these lines of ware.

Other objects of the invention will appear hereinafter.

Referring to the accompanying drawings:

Fig. 4 is a fragmentary sectional elevation similar to a portion of Fig. 1, but on a larger scale and viewed in a different direction.

Fig. 5 is a sectional plan view of a pair of article gripping fingers and operating means therefor.

Fig. 6 is a view similar to Fig. 5 but showing the gripping fingers in open position.

Fig. 7 is a section at the line 7—7 on Fig. 5.

Fig. 8 is a sectional elevation at the line 8—8 on Fig. 6.

Fig. 9 is a section at the line 9—9 on Fig. 5.

Fig. 10 is a section at the line 10—10 on Fig. 5.

Fig. 11 is a part sectional plan view of an article supporting cup and associated mechanism.

Fig. 12 is a section at the line 12—12 on Fig. 11.

Fig. 13 is a section at the line 13—13 on Fig. 1.

Fig. 14 is a section at the line 14—14 on Fig. 4.

Figure 1:
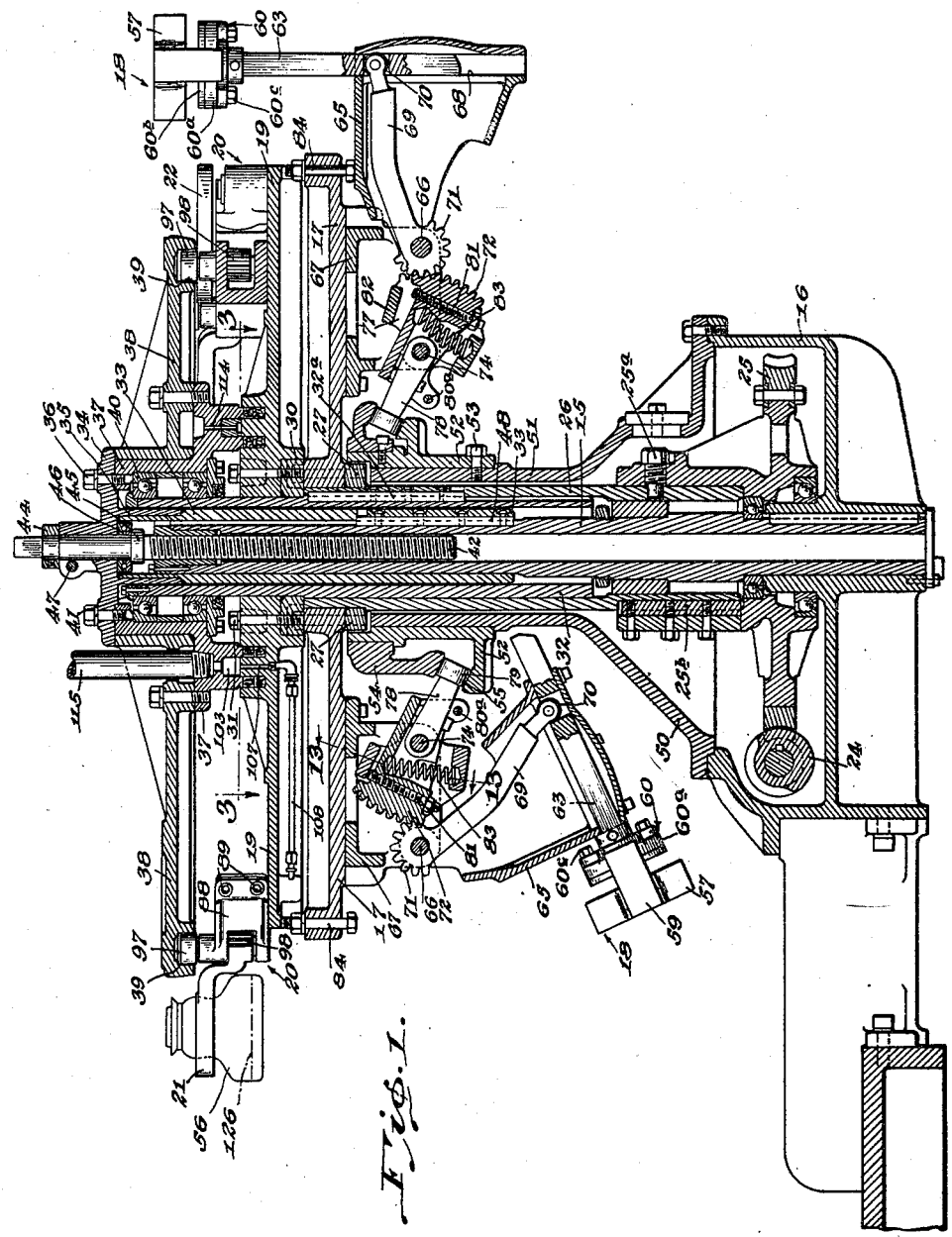
Fig. 1 is a sectional elevation of a machine embodying the principles of my invention.

Referring particularly to Figs. 1 to 4 the machine comprises, in general terms, a vertical center column 15 in the form of a tubular shaft having a fixed mounting in a casting 16 which forms a housing for the driving gearing, a carriage rotated continuously by said gearing about the axis of the column 15, said carriage including a cup carrying table 17 supporting an annular series of transfer cups 18, and a finger table 19 directly over the table 17 and carrying gripping finger units 20 individual to the cup units and each comprising a pair of gripping fingers 21, 22 for gripping articles supported in the cups 18 and transferring them to any desired position, as, for example, to supporting plates 23 (Fig. 2) on a burn-off machine.

The driving mechanism includes a worm drive shaft having a worm 24 running in mesh with a worm gear 25 on an upwardly extending hub which is attached by means of a screw 25$^a$ and key 25$^b$ to a rotary, tubular shaft 26 surrounding and spaced from the center column 15. The cup table 17 is mounted on the upper end of the shaft 26 for rotation therewith and is supported by a ring 27 which surrounds and is welded to the shaft 26. The table 17 is secured to said ring by bolts 28 (Fig. 4).

The finger table 19 is supported on a ring 30 to which it may be secured by bolts 31. The ring 30 is welded to a tubular shaft 32 which extends downward within the tubular shaft 26. The shaft 32 is adjustable up and down in the manner hereinafter described, for adjusting the finger table 19 up and down. A key 32$^a$ provides a driving connection between the rotating shaft 26 and the shaft 32. Within the shaft 32 is a non-rotatable tubular shaft 33 or sleeve, on which is mounted a cap plate 34 having a hub extension 35 surrounding the reduced upper end portion of the sleeve 33. The plate 34 is secured by screws 36 to a non-rotatable ring member 37. Bolted to the latter is a cam plate 38 formed on its underside with a cam track 39 which controls the operation of the gripping fingers as hereinafter described. Roller bearings 40 are interposed between the ring member 37 and the rotary shaft 32. Attached to the upper end of the shaft 32 is a ring 41 which overhangs the bearings 40 (Fig. 4) and thereby provides a support for the shaft 32 and parts connected thereto.

The finger table 19 and parts surmounting it including the ring member 37, cam plate 38 and cap 34, are adjustable up and down for accommodating work-pieces of different lengths or heights. The adjusting means includes a rod 42 screw threaded through a sleeve 43 (Fig. 4) attached to the upper end of the center column 15. The rod 42 extends through the cap plate 34 and is held against lengthwise movement relative thereto by a collar 44 and shoulder 45. A thrust bearing 46 is interposed between said shoulder and the cap plate 34. The rod 42 is clamped in its adjusted position by a clamping screw 47. A key 48 provides a spline connection between the sleeve 33 and the center column 15, permitting said vertical adjustment while holding the cam plate 36 and attached parts against rotative movement.

The housing for the worm gearing includes a cover plate 50 bolted to the casting 16 and extended upwardly in the form of a sleeve 51 surrounding the shaft 26. A cam ring 52 surrounds the sleeve 51 and is attached thereto by screws 53. A cam ring 54, surrounding and attached to the ring 52, is shaped to provide therewith a cam track 55 controlling the movements of the cups 18 and their operating mechanism which will now be described.

As shown, the cup mechanisms comprise 12 units which are symmetrically arranged in an annular series. The cups (see Fig. 1) are shaped to provide a support for a circular work-piece 56. Each cup comprises a pair of oppositely disposed plates 57 provided with lining pads 58 of asbestos or the like, providing contact surfaces for the work-piece. The plates 57 are secured to a pair of arms 59 (Figs. 11, 12) adjustably mounted in a head 60. A bottom plate 60ᵃ for the cup, with a lining 60ᵇ of asbestos or the like, is secured by bolts 60ᶜ to the head 60. The arms 59 have horizontal portions formed or provided with racks 61 which engage a pinion 62 journalled on the upper end of a rod or stem 63 attached to the head 60 by a pin 64. The pinion and racks permit adjustment of the arms toward and from each other, adapting them to articles of different diameters and are clamped in adjusted position by the bolts 60ᶜ.

The cup stem 63 is mounted for up and down sliding movement in a slideway 68 formed in a housing arm 65 which is mounted for swinging movement about the axis of a pivot pin 66 journalled in a bracket 67 bolted to the underside of the finger table 17. The sliding movement of the stem 63 is effected by means of a rock arm 69 fulcrumed on the pivot pin 66, the outer end of said arm carrying a bearing roller 70 which engages an opening 71' in the stem 63. The arm 69 is formed with a segmental gear 71 which meshes with a gear segment 72 formed on a segmental lever 73 which fulcrums on a pivot pin 74 keyed in the bracket 67. The housing arm 65 is provided with a segmental gear 75 meshing with a gear segment 76 formed on a segmental lever 77 which also fulcrums on the pivot pin 74. An arm 78 pivoted on the pin 74, carries a cam follower roll 79 running on the cam track 55. The arm 78 is rotatively adjustable in the segmental lever 73 through an adjusting pin 80, and is clamped in adjusted position by a clamping screw 80ᵃ. Relative movement of the segmental levers 73 and 77 is limited by a stop screw 81 adjustable in the lever 73 and arranged to engage a stop surface 82 on the lever 77. A coil spring 83 is held under compression between the levers 73 and 77.

The operation of the cup swinging and lifting mechanism is as follows:

Referring to Fig. 1, the cup unit at the left side of the machine is shown with the arm 65 swung down and the cup with its stem 63 retracted. It will be noted that the spring 83 is in its expanded position, holding the stop screw 81 against its stop. As the carriage rotates, the arm 78 is swung upwardly under the control of the cam track thereby rocking said arm and the segment levers as a unit about the axis of the pin 74. This swings the arm 65 upwardly to the horizontal position shown in Fig. 4 in which it is arrested by an adjustable stop 84 on the cup table 17, with the stem 63 in a vertical position. When the arm 65 is thus arrested, further rotation of the segmental lever 77 is prevented so that the continued upward swinging movement of the arm 78 swings the segmental lever 73 relative to the lever 77, thereby rocking the arm 69 about its pivot and thus moving the stem 63 and cup 18 vertically upward, at the same time compressing the spring 83. The cup 18 is now in its uppermost position, as shown at the right in Fig. 1, to receive a work-piece. As the carriage continues its rotation, the cup may be lowered vertically to bring the work-piece into position to be received and held by the gripping fingers 21 and 22 which hold the work-piece while the cup is again lowered, first vertically and then swung inward.

The finger units will now be described. These units are arranged in an annular series on the finger table 19 and each cooperates with the cup unit directly thereunder. Each finger unit (Figs. 5 to 10) comprises a pair of fingers 21 and 22 which may be provided with a lining 85 of asbestos or the like. The fingers are mounted to swing respectively about pivot pins 86 and 87. The pivot pins are mounted in a housing member 88 which is attached by screws 89 to a support in the form of a casting 90. The latter is mounted to swing about the axis of a pivot bolt 91 which extends through an opening in the rim of the table 19 (Figs. 8 and 9) and is clamped therein by a nut 92. The pivot bolt extends through a vertical cylindrical bore 93 in the casting 90 and is centered therein by upper and lower collars 95 and 96. The casting 90 and the housing 88 secured thereto, together form an arm or unit which oscillates about the pivot 91 as will presently be described. The pivot pin 86 for the finger 21, is extended upward and carries a cam follower roll 97 which runs in the cam track 39 and controls the swinging movements of the finger unit about the pivot 91. The fingers are formed with intermeshing segmental gears 98.

The fingers are rocked about their pivots by means of an air operated piston motor comprising a piston 100 mounted to reciprocate in a horizontal cylindrical bore formed in the casting 90. A rack 101 on the piston rod runs in mesh with the segment 98 on the finger 22. The piston is moved inwardly by air pressure supplied in front of the piston for swinging the fingers to position for gripping the work-piece. The piston is moved outwardly to separate the fingers by means of a coil compression spring 102 which is housed in a central opening in the piston.

Figure 3:
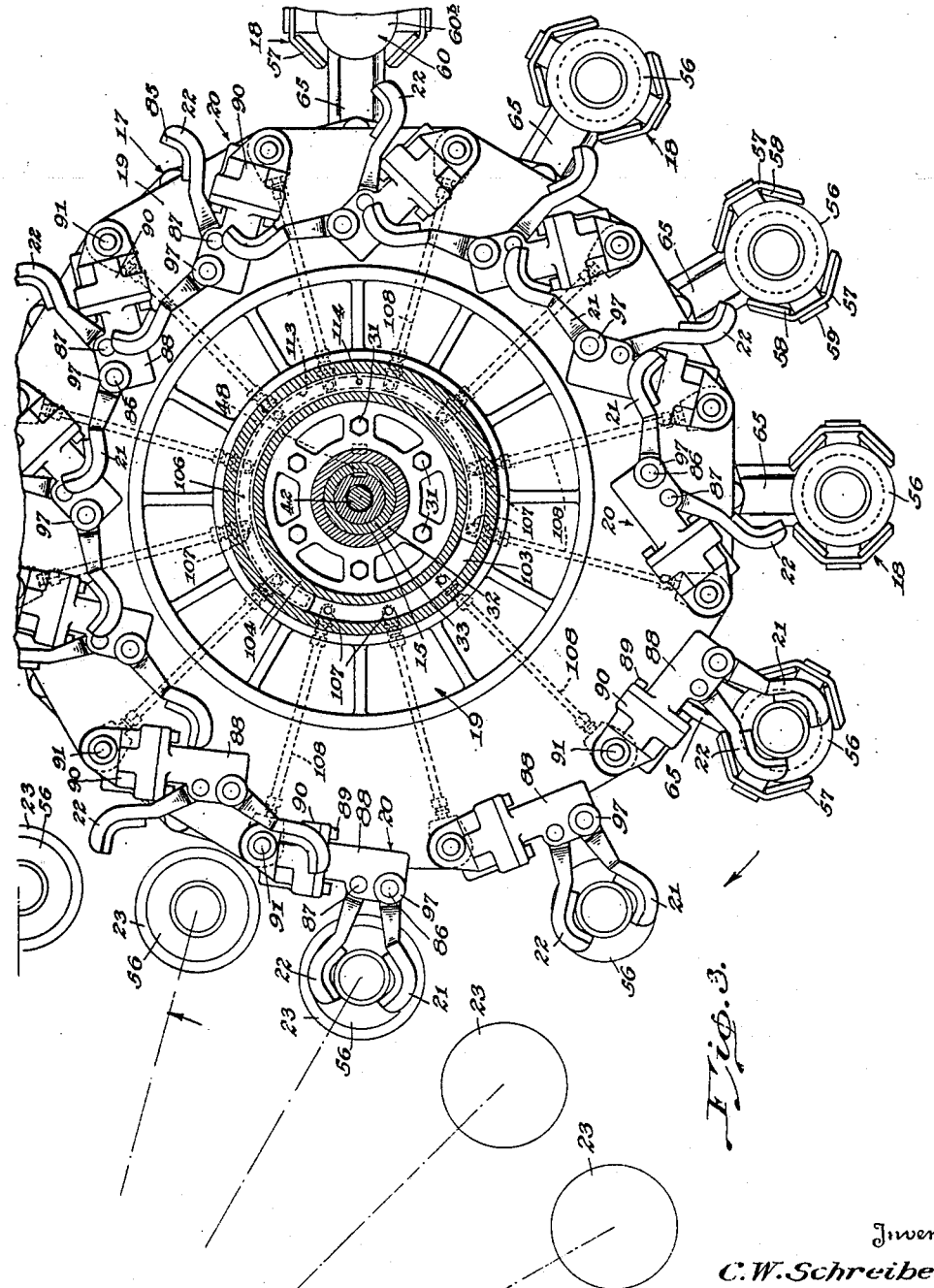
Fig. 3 is a sectional plan at the line 3—3 on Fig. 1.

The air system for supplying air pressure to the piston motors will now be described. Referring to Figs. 1 and 4, the ring member 37 is formed with an annular channel 103 in its lower face, the side walls 104 of said channel being in the form of annular flanges which extend downwardly into grooves formed in the upper face of the finger table 19. Packing material 105 in said grooves provides a seal by which leakage of air from the channel 103 is prevented. Within the channel 103 is a segmental bar 106 which seats on the upper face of the finger plate 19, and as shown in Fig. 3 extends approximately three-fourths the circumference of the channel. Air lines individual to the piston motors, each comprises a conduit or port 107 extending downward through the table 19 and connected by an elbow with the inner end of a pipe 108, the outer end of which opens into a port 109 (Fig. 9) which communicates with a central bore in the pivot 91. The air line is continued through a port 110 to bore 93. A passageway 111 (Figs. 5, 7 and 8) extends through the wall of the motor cylinder and opens into the latter at a port 112 in front of the motor piston.

The ring segment 106 is formed in its lower face with a groove or channel 113 (Fig. 4) which, as shown in dotted lines (Fig. 3), extends throughout the greater part of the length of said segment. Said channel is open to atmosphere through a vent 114. Air under pressure is supplied to the distributing chamber or channel 103 through a pipe 115 (Fig. 1) connected to a source of air pressure supply. As the finger table 19 rotates, the ports 107 therein are carried in succession from beneath segment 106, thereby opening the air pressure lines in succession to their respective motors. As air pressure is thus supplied to a motor through its port 112 (Fig. 5), the piston is moved inwardly and thereby swings the fingers to article gripping position. This position is maintained until the corresponding port 107 passes from beneath the segment 106, thereby cutting off the air pressure supply and opening the port 107 to the channel 113. This relieves the pressure in the motor cylinder so that the compression spring 102 moves the piston outwardly and swings the gripping fingers to open position.

Figure 2:
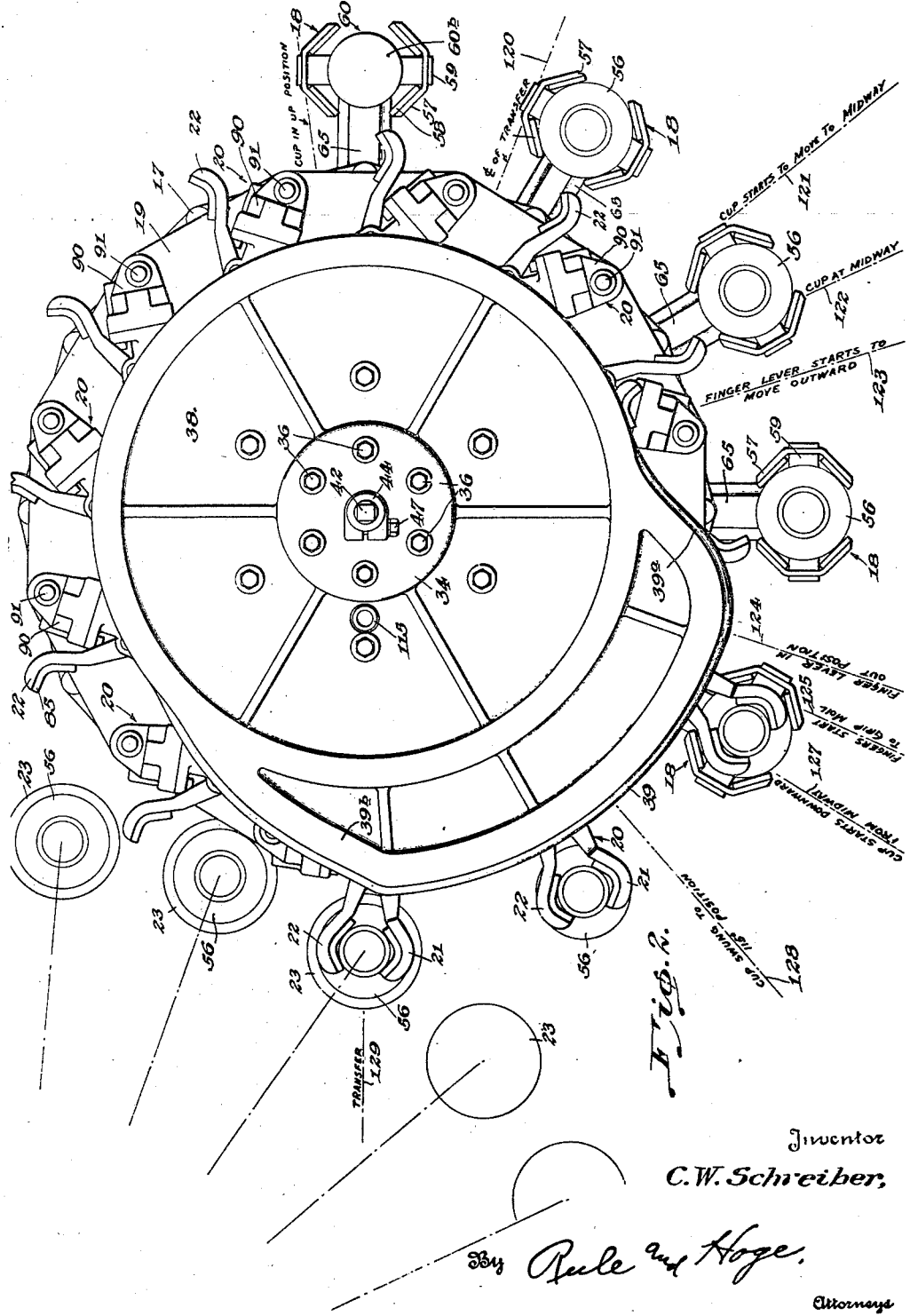
Fig. 2 is a top plan view of the machine.

The operation of the machine is as follows:

As the carriage rotates and advances a holding cup 18 from the position shown at the right in Figs. 1, 2, and 3 in which the cup is in its uppermost position, a workpiece 56 is placed automatically in the cup as the latter passes the transfer position indicated by radial line 120 (Fig. 2). When position 121 is reached, the cup commences to move vertically downward under the control of cam track 55. This movement continues until the cup reaches an intermediate position (at line 122) in which the work-piece is on a level with the gripping fingers, such level being then maintained until the work-piece has been gripped by said fingers. At position 123 the finger carrier 88, 90 (Fig. 3) commences to swing outwardly about the pivot 91, under control of an operating section 39ª (Fig. 2) of the cam track 39. This movement is completed by the time position 124 is reached. Following this the air pressure line is opened (at line 125) to the piston motor by the port 107 running from under the segment 106, so that the motor operates the fingers to grip the work-piece. As shown in Fig. 1 the fingers grip the upper portion of the work-piece, namely, the moil which is to be severed at the line 126 from the molded article.

The article being now held by the gripping fingers, the cup 18 resumes its downward movement when radial position 127 is reached. When this vertical downward movement is completed, the arm 65 (Fig. 4) starts its downward and inward swinging movement which is completed by the time position 128 (Fig. 2) is reached. The cup 18 is now beneath the table 17 as shown at the left in Fig. 1 and the work-piece supported in the gripping fingers. The work-piece continues to advance horizontally until it reaches the transfer position 129 in which it is directly over a bottom supporting plate 23 on the burn-off machine. At this point the port 107 is again brought beneath the ring segment 106, thereby closing the air pressure line to the piston motor and venting the latter to the atmosphere. The motor is thus reversed so that the gripping fingers are separated, leaving the work-piece supported on the plate 23. The cam section 39ᵇ (Fig. 2) of the cam track 39, now operates to swing finger carrier 88, 90 inwardly. Before the cup 18 completes its rotation with the carriage, it is again swung up and moved vertically to its uppermost position, thereby completing the cycle.

Modifications may be resorted to within the spirit and scope of my invention.

I claim:

1. An article transfer mechanism comprising a carriage, means for rotating it about a vertical axis, an article holder and an article gripping device mounted on the carriage for rotation therewith, automatic means for actuating the gripping device during the rotation of the carriage and causing it to grip an article supported on the holder, and means for withdrawing the holder vertically downward, leaving the article supported by the gripping device, and then swinging said holder inwardly toward the axis of the carriage.

2. An article transfer mechanism comprising a carriage, means for rotating it about a vertical axis, a rock arm pivotally mounted on the carriage to swing downwardly and inwardly from a horizontal position in which it extends outwardly from its pivot in a direction radial to the carriage, an article holder slidably mounted on said arm for vertical movement when the arm is in its horizontal position, and automatic means operable during the rotation of the carriage to move said holder downward on said arm and thereafter to swing said arm with the holder thereon downward about its pivot.

3. An article transfer mechanism comprising a carriage, means for rotating it about a vertical axis, a rock arm pivotally mounted on the carriage to swing downwardly and inwardly from a horizontal position in which it extends outwardly from its pivot in a direction radial to the carriage, an article holder slidably mounted on said arm for vertical movement when the arm is in its horizontal position, a stationary cam, and means providing operating connections between the cam and the said rock arm and holder for moving the holder downward on the arm and thereafter swinging the arm and holder downward.

4. An article transfer mechanism comprising a carriage, means for rotating it about a vertical axis, an arm extending radially of the carriage and pivoted at its inner end on the carriage, an article holder slidably mounted for up and down movement on said arm, a second arm pivoted to swing about the axis of said first mentioned arm, a stationary cam, and means providing operating connections between the cam and said arms for swinging said second arm about its pivot and thereby moving the said holder downward and thereafter swinging said arms as a unit about said pivot.

5. An article transfer mechanism comprising a carriage, means for rotating it horizontally about an axis, an arm on the carriage extending radially thereof and mounted to swing about a horizontal pivot at the inner end of the arm, an article holder slidably mounted in said arm for up and down movement when said arm is in horizontal position, a second arm mounted to swing about said pivot and operatively connected to said holder, means for swinging said second arm about its pivot for moving said holder downward, and means for swinging both said arms as a unit and thereby swinging the said holder downwardly and inwardly about said pivot.

6. An article transfer mechanism comprising a carriage, means for rotating it horizontally about an axis, an arm on the carriage extending radially thereof and mounted to swing about a horizontal pivot at the inner end of the arm, an article holder slidably mounted in said arm for up and down movement when said arm is in horizontal position, a second arm mounted to swing about said pivot and operatively connected to said holder, means for swinging said second arm about its pivot for moving said holder downward, and means for swinging both said arms as a unit and thereby swinging the said holder downwardly and inwardly about said pivot, said means for swinging said arms comprising gears on said arms, racks meshing with said gears, and cam means for actuating said racks.

7. An article transfer mechanism comprising a carriage, means for rotating it about a vertical axis, an annular series of article gripping devices mounted on the carriage, air operated piston motors individual to said gripping devices, means providing operating connections between the motors and gripping devices, means for supplying air under pressure to said motors in succession including a stationary, annular air pressure chamber concentric with the axis of the carriage, air lines individual to the motors and extending from said chamber, and means for opening said air lines in succession to said chamber.

8. An article transfer mechanism comprising a carriage mounted for rotation about a vertical axis, means for driving the carriage, said carriage including a horizontal table, an annular series of article gripping units mounted on the table, each said unit including a horizontally disposed carrier pivoted to the table for horizontal swinging movement and a pair of gripping fingers pivoted on the carrier, each said unit including a piston motor, means providing operating connections between the motor pistons and the fingers for swinging the latter about their pivots, a stationary cam, and means actuated thereby for swinging said carriers about their pivots.

9. An article transfer mechanism comprising a carriage mounted for rotation about a vertical axis, means for driving the carriage, said carriage including a horizontal table, an annular series of article gripping units mounted on the table, each said unit including a horizontally disposed carrier pivoted to the table for horizontal swinging movement and a pair of gripping fingers pivoted on the carrier, each said unit including a piston motor, means providing operating connections between the motor pistons and the fingers for swinging the latter about their pivots, and a stationary cam plate formed with a closed cam track, each said gripping unit comprising a cam follower roll mounted on the pivot of one of said fingers and running on said cam track.

10. An article transfer mechanism including an article holder comprising a pair of oppositely disposed arms, article holding plates mounted on said arms, a head in which said arms are slidably mounted for movement toward and from each other, said head including a bottom supporting plate for supporting the articles, a stem attached to said head, and a pinion on said stem, said arms being formed with rack teeth in mesh with said pinion.

11. An article transfer mechanism including an article holder comprising a pair of oppositely disposed arms, article holding plates mounted on said arms, a head in which said arms are slidably mounted for movement toward and from each other, said head including a bottom supporting plate for supporting the articles, a stem attached to said head, a rock arm forming a carrier for said holder, said stem being slidably mounted for lengthwise movement in said rock arm, and automatic means for sliding said stem in said rock arm.

CARL W. SCHREIBER.